US011297858B2

(12) United States Patent
Mecray

(10) Patent No.: US 11,297,858 B2
(45) Date of Patent: Apr. 12, 2022

(54) PLANT-BASED YOGURT PRODUCT AND METHOD OF MAKING SAME

(71) Applicant: Novare Food Products LLC, Cumberland, ME (US)

(72) Inventor: Matthew C. Mecray, Cumberland, ME (US)

(73) Assignee: Novare Food Products LLC, Cumberland, ME (US)

( * ) Notice: Subject to any disclaimer, the term of this patent is extended or adjusted under 35 U.S.C. 154(b) by 486 days.

(21) Appl. No.: 15/933,904

(22) Filed: Mar. 23, 2018

(65) Prior Publication Data

US 2018/0271126 A1 Sep. 27, 2018

Related U.S. Application Data

(60) Provisional application No. 62/475,676, filed on Mar. 23, 2017.

(51) Int. Cl.
*A23L 11/00* (2021.01)
*A23L 11/50* (2021.01)
*A23L 25/00* (2016.01)
*A23C 11/10* (2021.01)

(52) U.S. Cl.
CPC .............. *A23L 11/50* (2021.01); *A23C 11/106* (2013.01); *A23L 25/40* (2016.08); *A23C 2240/15* (2013.01); *A23C 2260/05* (2013.01); *A23C 2260/152* (2013.01)

(58) Field of Classification Search
CPC ...................................................... A23L 11/09
See application file for complete search history.

(56) References Cited

U.S. PATENT DOCUMENTS

| 4,563,356 A | * | 1/1986 | Fujisawa | A23C 11/106 426/44 |
| 2003/0147995 A1 | * | 8/2003 | Koss | A23G 9/04 426/72 |
| 2010/0098789 A1 | | 4/2010 | Balambika et al. | |
| 2014/0234488 A1 | | 8/2014 | Chang | |

(Continued)

FOREIGN PATENT DOCUMENTS

| WO | 2013010037 | 1/2013 |
| WO | 2016172570 | 10/2016 |

OTHER PUBLICATIONS

Feng CN103828918 Derwent Abstract 1 page. Jun. 4, 2014 2 pages (Year: 2014).*

*Primary Examiner* — Felicia C Turner
(74) *Attorney, Agent, or Firm* — Gearhart Law LLC; David Postolski, Esq.

(57) ABSTRACT

A method for making a plant-based yogurt product, by combining and mixing a predetermined amount of pulse of legumes, a predetermined amount of seeds and/or nuts, and a predetermined volume of water to create a first mixture. Then combining a predetermined amount of soy beans with water to create a second mixture that and heating it to a near boiling temperature, combining and mixing the first mixture and the second mixture. Then heating the combined mixture to between about 175 to about 190° F. for a predetermined time period, cooling, and adding a bacterial culture to the combined mixture and maintaining the combined mixture at between about 110° F. and about 120° F.

5 Claims, 1 Drawing Sheet

(56) References Cited

U.S. PATENT DOCUMENTS

2015/0313951 A1\* 11/2015 Cash .................... A23C 20/025
                                                               424/93.46
2016/0309732 A1    10/2016 Gugger et al.
2017/0042172 A1\*  2/2017 Maljaars .............. A23C 9/1238

\* cited by examiner

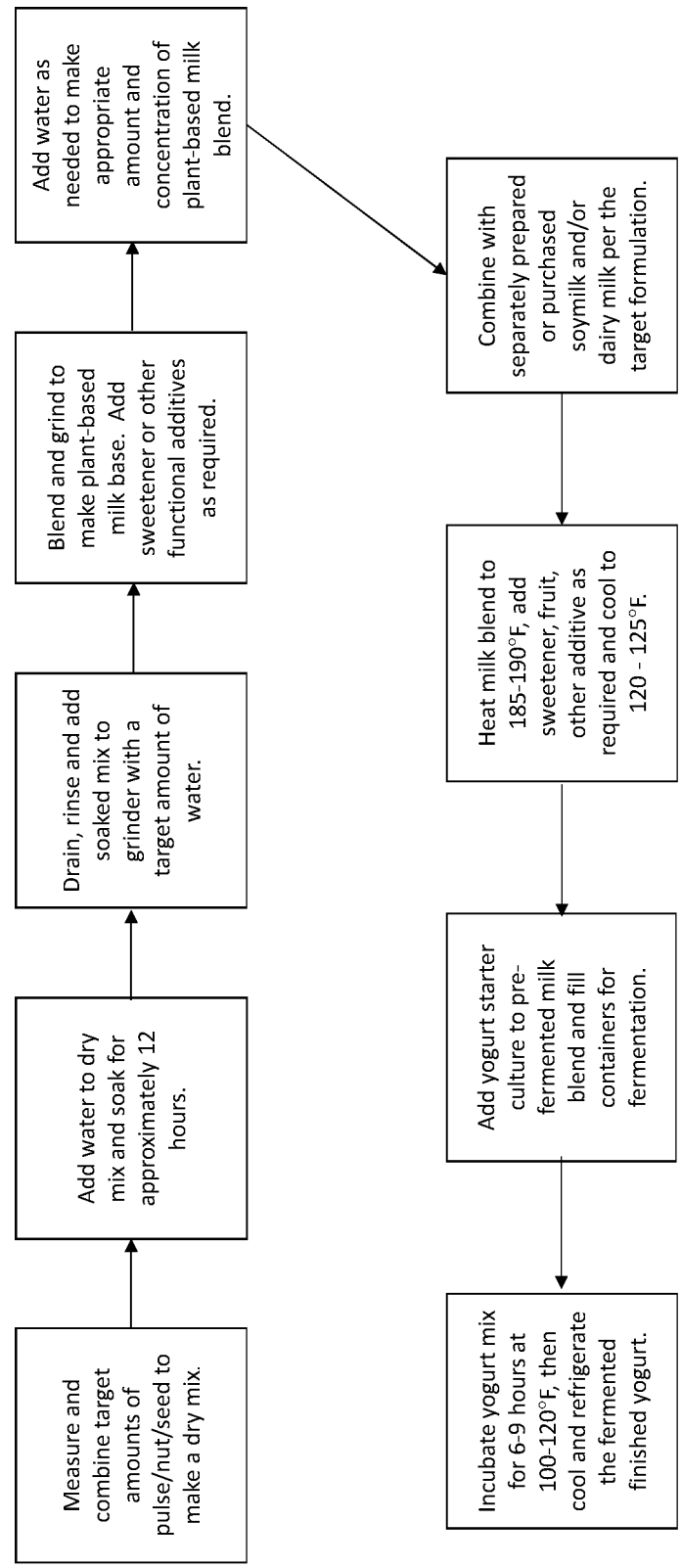

PLANT-BASED YOGURT PRODUCT AND METHOD OF MAKING SAME

CLAIM OF PRIORITY

This non-provisional application claims priority to U.S. provisional application 62/475,676 filed on Mar. 23, 2017, the contents of which is fully incorporated by reference in its entirety.

FIELD OF THE EMBODIMENTS

The field of the embodiments relate to a plant-based yogurt product and method of making the product using specific steps and ratios in order to produce a desired consistency and texture.

BACKGROUND OF THE EMBODIMENTS

Yogurt products are enjoyed by people around the world. A conventional yogurt is produced by bacterial fermentation of milk. Specifically, to produce a conventional yogurt, milk is heated, and then a bacterial culture is mixed into the heated milk, and the mixture is maintained at an elevated temperature to allow fermentation.

There has been rapid growth in consumption of various plant-based products, including milk alternatives, based on soy, almond, hemp, cashew, flax, etc. The growth of these non-dairy milk alternatives has been driven by favorable flavor and textures of these milks, as well as their lower calorie contents. Importantly, another driver has been the overall trend toward more plant-based diets for health and environmental reasons.

To meet this consumer demand for plant-based products and diets, common dairy products, like cheese or milk, are increasingly consumed in plant-based product forms. In this regard, there are plant-based yogurt products available, such as almond yogurt, cashew yogurt or soy yogurt. Soy yogurts products having acceptable thickness, texture and protein without using additives can be easily made, and they are commercially available, but many consumers object to the soybean taste, and there are other consumers who wish to minimize intake of soy products in general. The taste, ingredient and/or nutritional profiles of the other plant-based yogurt products made for example using specific nuts or seeds are less than favorable. For instance, such plant-based yogurt products often contain a range of additives or processed ingredients to provide a yogurt-like thickness and texture; they typically have high added carbohydrate content to provide body and flavor; and/or they often have low protein content. There are significant challenges in formulating and making these plant-based yogurt products with the full combination of acceptable appearance, thickness, flavor, texture, ingredients and nutritional profile.

Use of pulses or legumes in yogurt, other than soybean, is very challenging due to a combination of issues related to taste, thickness, texture, appearance and processability. A review of the prior art follows:

WIPO Publication 2016172570A1 pertains a non-dairy substitute which can be produced from comparatively high starch legumes, such as chickpeas and adzuki beans. In some examples, the non-dairy substitute is produced by hydrating the high starch legumes, remove excess water, and then heating the hydrated high starch legumes in the presence of water and amylase at a controlled pH to reduce the starch content of the legumes. The slurry of reduced starch content can then be filtered to remove insoluble fiber and suspended soluble fiber present in the legume slurry, producing a non-dairy "milk" that can be used in a variety of products. In different examples, the legume "milk" is cultured with the addition of bacterial cultures to form a cheese or yogurt and/or formed into a non-dairy ice cream. In any application, an acidifying ingredient such as citric acid may be added to the product. This can help reduce or eliminate residual legume flavor.

U.S. Pub. 2010/0098789 pertains to a turmeric, turmeric components, curcumin or curcuminoid modified nut or seed butter spread which is resistant to oxidation with improved cu/co/tc/tu/mx solubility and possessing some human health benefits comprising: 0.2-70% of components selected from the group consisting of curcumin, curcuminoids, turmeric components and turmeric; and 30-99.8% of nut or seed particles and/or nut/seed butters as a dispersing medium. This spread has increased resistance to oxidation and bacterial attack as compared to the nut or seed butter alone. Based on health studies of curcumin, the modified nut or seed butter spread is also expected to have significant preventative health benefits including effectiveness as a chemopreventive, anti-Alzheimer's, anti-inflammatory, and antibacterial agent. The nut/seed butter medium improves the solubility and bioavailability of cu/co/tc/tu/mx.

WIPO Publication 2013010037 pertains to methods and compositions for the production of cheese replicas. Generally the cheese replicas are produced by inducing the enzymatic curdling of non-dairy milks.

However, there is still a need for a yogurt product that mitigates the significant challenges in using pulses or legumes other than soybeans in yogurt products. This is concurrent with the need for innovative plant-based yogurt products beyond soy that offer the full combination of attractive taste, thickness, texture, appearance and nutritional profile with a short and simple list of whole and unprocessed natural ingredients.

SUMMARY OF THE EMBODIMENTS

In general, the present invention and its embodiments describe a plant-based yogurt product and method of making the product using specific steps and ratios in order to produce a desired consistency, texture, taste, and appearance.

BRIEF DESCRIPTION OF THE DRAWINGS

FIG. 1 shows a flow chart of an embodiment of the process

DETAILED DESCRIPTION OF THE PREFERRED EMBODIMENT

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations be made thereto. The description is not intended in a limiting sense and is made solely for the purpose of illustrating the general principles of the invention.

The innovation is a novel formulation and processing method for plant-based yogurts and Greek style yogurts. These formulations consist of combinations of fermented bean milks, nut milks, seed milks, and as desired with one or both of soy milks and dairy milks. The resulting products can be clean-label with no other added thickeners or the like required, and have very favorable nutritional profiles with relatively lower calorie, lower carbohydrate, and protein levels similar to conventional dairy milk yogurts and Greek yogurts. Additionally, since the formulations are based on whole beans/nut/seeds, they also provide notable amounts of nutritional prebiotic fiber along with probiotic yogurt cultures, as well as healthy fats.

FIG. 1 demonstrates process for making a plant-based or mostly plant-based yogurt product made from a unique combination of pulses and nuts and/or seeds, and also including, but not necessarily limited by, additions of soybean or dairy milk. The resulting yogurt product has a protein and overall calorie content similar to traditional dairy milk yogurt, with a lower carbohydrate content, high fiber content, and an attractive appearance, thickness, texture, flavor and clean and simple list of whole and unprocessed natural ingredients.

A plant-based yogurt product made in accordance with the present invention generally comprises a combination from the following components: (a) pulse from legumes; (b) seeds and/or nuts; (c) a dairy component; (d) a soy component; (e) a bacterial (starter) culture; and/or (f) sweeteners, flavorings, fruit products, and/or savory additions.

With respect to the pulse from legumes, in at least some preferred formulations, it is contemplated that the pulse would make up 10-35% of the yogurt product by dry weight Too little pulse and the functional and health benefits of using pulse become marginalized. Too much pulse and the formulation will be unacceptable due to the pre-fermentation yogurt milk gelling upon initial heating. Also, the yogurt milk will not setting up properly upon fermentation yielding a product that is separated and potentially has a low-viscosity soft final set thickness. Finally the product that can have unacceptable off-white color and strong beany flavor. Many of the pulses, even at these ratios, will yield a yogurt products that is unacceptable for similar reasons. In this regard, black lentils that have been split and skinned are preferred, but other pulses including chickpeas, may also be used alone or in combination. An additional benefit of the pulse component ratio is that the pre-fermented yogurt milk is readily pourable and stirrable but yet has a higher viscosity than normal dairy milk. Importantly this increased viscosity stabilizes the suspension of the fiber component from pulses that would otherwise settle to the bottom yielding an unacceptable final product. This increased viscosity can also be advantageously used to uniquely suspend a distributed blend of other solid ingredients, for example fruits, fruit pieces, or other flavor/texture enhancing ingredients in the liquid during the fermentation step, yielding a container-set yogurt product with distributed ingredient additions.

With respect to seeds and/or nuts, in at least some preferred formulations, it is contemplated that such seeds and/or nuts would make up 20-60% of the yogurt product by dry weight. This ratio of seeds and/or nuts enables and optimizes the effective use of the pulse component. With too many nuts and/or seeds the pulse component ratio becomes too low and the resulting yogurt product will lose one or more of the attractive features listed above, for example not having a firm final set thickness, or becoming too high in fat and calorie content, or low in protein.

Pumpkins seeds (or pepitas), which can be raw or lightly toasted, are a preferred seed component. Almonds and cashews are preferred nut components. Other seeds and/or nuts, including for example sunflower seeds, hazelnuts, or pistachios may also be used without departing from the spirit and scope of the present invention.

In practice, in most preferred formulations, the first component (pulse from legumes) and the second component (seeds and/or nuts) would collectively make up approximately 60-80% of the yogurt product by dry weight.

With respect to the dairy component, in at least some preferred formulations, it is contemplated that such dairy component would make up 0-40% of the yogurt product by weight. The lower limit of this range is 0% because the dairy component would not be used if the intent is to produce a dairy-free (or vegan) yogurt product. Dried skim milk is preferred, but whole or low-fat dried milk, or, in some cases, liquid milk, may also be used without departing from the spirit and scope of the present invention.

With respect to the soy component, in at least some preferred formulations, it is contemplated that such soy component would make up 0-40% of the yogurt product by weight. The lower limit of this range is 0% because, in some cases, soy would not be used if the intent is to produce a soy-free yogurt product. Whole soy beans are preferred. However, processed soy milk or soy milk prepared with skins or okara removed may also be used without departing from the spirit and scope of the present invention.

In practice, in most preferred formulations, the third component (dairy component) and/or the fourth component (soy component) would collectively make up approximately 20-40% of the yogurt product by weight.

With respect to the bacterial (starter) culture, various bacterial cultures suitable for the yogurt product are commercially available, including, for example, the "ABY-611 Yogurt" culture or the "Dairy-free Yogurt Culture (Vegetal)" culture, each of which is available from the Dairy Connection Inc. of Madison, Wis.

With respect to the sweeteners, various sweeteners may be incorporated into the yogurt product of the present invention, including, but not limited to, sugars and low-calorie or no-calorie sweeteners. With respect to flavorings, various flavorings may be also incorporated into the yogurt product of the present invention, such as maple, vanilla, almond, lemon, etc. Furthermore, various fruit purees and other fruit products, nuts or seeds could be incorporated into the yogurt product, and savory additions, such as vegetable products, salt, and spices, could also be incorporated into the yogurt product. Likewise other functional ingredient additions, for example such as table salt or a calcium compound can be added for flavor, texture, nutrition or other functional benefits.

In making the plant-based yogurt product of the present invention, the pulse from legumes, seeds and/or nuts, and an optional dairy component, and soy component are mixed, ground and blended together with water, for example, in a high-speed sheer mixer, to make the milk-like pre-fermented liquid mix. The mix is then heated to 185 degrees F. to sterilize the blend and affect positive changes in starch and proteins. For formulations incorporating pumpkin seeds for example, it is critical to heat the pre-fermented blend as a blend, and not heated as individual components. Heated individually, the pumpkin seed liquid blend undergoes a rapid transformation at about 185 F rendering the liquid mix useless as a yogurt base due to severe coagulation and separation, due to changes in the structure of the proteins present in the pumpkin seeds. Furthermore, the heating to ~185 F of the liquid blend, containing pumpkin seeds or otherwise, significantly increases and improves the firmness or thickness of the final set yogurt. The mixture is then cooled to the appropriate temperature. Also, it is important to heat the combined mixture to a temperature of ~185° F. or higher to improve stabilization of the suspended prebiotic solids and to increase the firmness or thickness of the final set yogurt product. This is due both to gelation or viscosity increase from the pulse component upon heating, and the denaturization of proteins. Heating to less than ~185° F. will result in a yogurt product with much different texture, having a more liquid-like set thickness characteristic after incubation, and a greater degree of settling of the fiber/solids from suspension. Both aspects being undesirable. Also with respect to the heating step, it is important to note that the time at elevated temperature be minimized with rapid heating and cooling, in particular with some pulses more so than others, e.g. black lentils vs. chickpeas, in order to minimize overall viscosity increase, presumably due to starch gelatinization. Such overgelatinization results in a very thick viscosity pre-fermented liquid mix, as well as a final set yogurt product that is not firmly set, and has a high degree of separated water.

Prior to grinding and mixing of the pulse, nut and seed containing liquid blend, it is preferred to soak the dry mix in water for a period of time, on the order of 10-20 hrs, and then drain and rinse. Similar to the step of heating to ~185 F, the presoaking step has been found to improve the final set yogurt firmness or thickness, and can in some cases mitigate off-flavors present in certain ingredients.

A bacterial (starter) culture can be added to the pre-fermented blend at the appropriate cooled temperature, typically about 120 F, and the mixture is maintained at an elevated temperature for a predetermined incubation time period to allow fermentation and coagulation into the set yogurt product.

The resulting yogurt product is a "clean-label" product. Unlike typical plant-based yogurts, does not require thickeners, stabilizers, or other additives to keep the fiber content suspended throughout the yogurt or to provide the thickness or texture that consumers expect in a yogurt product. The resulting yogurt product also has a very favorable nutritional profile with relatively lower calorie content, lower carbohydrate content, and protein content similar to conventional (dairy) yogurts and Greek-style (or strained) yogurts. Additionally, since legumes, seeds, and nuts are the primary ingredients, the plant-based yogurt products of the present invention also provide notable amounts of nutritional prebiotic fiber, probiotic yogurt cultures, and healthy fats. Finally, and perhaps most importantly, the blend of nuts, seeds, and beans provides a yogurt products with a very pleasing flavor profile, while avoiding any undo processing of these components to reduce or eliminate off-flavors.

It is also possible to transform the yogurt product into a frozen yogurt (or ice cream-like) product, for example, by freezing the yogurt product. Additionally the yogurt product can be made into a drinkable yogurt product, or can be strained as in a greek yogurt in order to further boost the firmness or thickness, as well as increase the protein concentration.

One exemplary formulation of a plant-based yogurt product made in accordance with the present invention includes the following components (ingredients) in the amounts set forth below, with the intent of making one gallon of the plant-based yogurt product.

First, the following components are combined to make a first mixture:

160 grams of one or more pulses, e.g. black lentils that have been split and skinned, and/or chickpeas that have been split and skinned (Such black lentils may also be referred to as urad dal, white lentils, *Vigna mungo*, black gram, black lentil, mungo bean, and black matpe bean. Such chickpeas may also be referred to as *Cicer arietinum*, garbanzo bean, and black gram.)

140 grams of seeds, e.g. pumpkin seeds (Such pumpkin seeds may also be referred to as pepitas.)

140 grams of nuts, e.g. almonds and/or cashews, skins removed.

The above components are soaked in water for 12 hrs and rinsed. Next the soaked mixture of components is blended with a first volume of water (total volume of mix is 64 oz.) in a high-speed shear mixer for approximately five (5) minutes. A second volume of water (approx. 24 oz.) is then added, which results in approximately eleven (11) cups of the first mixture (which may be characterized as a "milk" of the legumes, seed, and nuts).

A second mixture (which may be characterized as a "soy milk") is then made from 110 grams of soy beans or soy flour). The soy bean component is then blended with water (total volume approx. 40 oz.) in a high-speed shear mixer for approximately five (5) minutes. The resulting soy milk is then cooked at boiling or near boiling temperature for approximately 20 minutes to yield approximately five (5) cups of soy milk. Alternatively, a commercially prepared soymilk, e.g. Westsoy Unsweetened Plain, may be used. The first and second mixtures are then combined together and heated to approximately 185° F., and then cooled to 120° F.

Sweeteners, flavorings, fruit products, nuts and/or savory additions, or other minor functional additives may be added to the mixture at this time or in prior steps.

The bacterial (starter) culture is added to the mixture, and then, the mixture is maintained at an elevated temperature for a predetermined time (or incubation) period to allow fermentation. In this example, the mixture is maintained at 110° F. for seven to nine hours.

The plant-based yogurt product is now complete and suitable for consumption, or some of the liquid component can be strained to improve viscosity, thickness, and consistency, resulting in a yogurt cheese or Greek-style like yogurt product. If desired the yogurt product may also be made into a drinkable form.

Use of black lentils (without skins) is preferred Other types of lentils/peas/beans can provide relatively thick yogurt, though not all; furthermore, most or all give unacceptable flavor and/or colors. Black lentil is mild tasting, provides for a thick yogurt, and is white in color. Given its characteristics to gel upon heating, the lentil milk component also serves as a stabilizer to maintain dispersion of the whole unfiltered nut/bean/seed fractions during the fermentation process to provide a wholesome product and a high degree of smoothness and uniformity without undue settling of fiber and other such fractions.

Use of pepitas or pumpkin seeds is preferred. Other seeds (e.g., sunflower seeds) can be used, but suffer from low set thickness and/or flavor and/or color.

Use of almond or cashew milk. Other types of nuts may not be as desirable given flavor and/or thickness of the fermented yogurt.

Notably, pumpkin seeds must be heated to about 185° F. in order to provide maximum thickness of the fermented product. Yet, this heating must be done in a blended formulation with other nut/seed/bean/dairy milks. Otherwise, if heated alone, the pumpkin seed milk will become denatured or gelled/separated in the liquid form, such as that it becomes unusable for making yogurt.

Use of whole soy milk is preferred, as opposed to filtered soy milk with the okara fiber fraction removed.

A blend of the above components, combined with some minor amount of dairy milk or milk powders, can provide optimal product qualities, including use of traditional yogurt starter cultures.

While use of some dairy or soy milk may be optimal, it is not critical. However, the thickest formulations contain either soy or dairy milk (non-fat, full-fat or in between), or both.

The resulting yogurt products on a weight basis can be predominantly pulse (e.g lentil/chickpea), seeds (e.g. pumpkin seeds), nuts (e.g. almond/cashew), with lesser amounts of soy or dairy on a solids weight basis. The yogurt products have a nutritional profile on the order of 100-150 calories per 8-oz cup, with 10-20 grams carbohydrate (of which half or so is fiber), and protein on the order of 8 grams per cup (similar protein content to that of dairy milk yogurt). No other stabilizers or thickener ingredients are necessary. Of course, various sweeteners or fruit additions, as common for conventional dairy yogurts, can be added. Straining the yogurt to remove some of the liquid fraction can provide a very nice thick, uniform, smooth and good-tasting Greek-style yogurt.

One of ordinary skill in the art will also recognize that additional embodiments and formulations are also possible without departing from the teachings of the present invention. This detailed description, and particularly the specific details of the exemplary embodiments and formulations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A plant-based yogurt product, consisting of:
    a predetermined amount of pulse of chickpeas, wherein the predetermined amount of chickpeas is in a range of about 10% to about 35% of the plant-based yogurt product by dry weight;
    a predetermined amount of pumpkin seeds and a predetermined amount of almonds, wherein the predetermined amount of pumpkin seeds and the predetermined amount of almonds is present in a range of about 20% to about 60% of the plant-based yogurt product by dry weight;
    a predetermined amount of a soy component, wherein the predetermined amount of the soy component is up to about 40% of the plant-based yogurt product by dry weight; and
    a bacterial culture.

2. The plant-based yogurt product of claim 1, wherein the predetermined amount of the pulse of chickpeas comprises about 160 grams.

3. The plant-based yogurt product of claim 1, wherein the predetermined amount of the pumpkin seeds comprises about 140 grams.

4. The plant-based yogurt product of claim 1, wherein the predetermined amount of the almonds comprises about 140 grams.

5. The plant-based yogurt product of claim 1, wherein the predetermined amount of the soy component comprises about 110 grams of soy beans or soy flour.

* * * * *